United States Patent [19]

Yamamoto

[11] Patent Number: 4,608,504

[45] Date of Patent: Aug. 26, 1986

[54] INTERFACE CIRCUIT FOR INTERCONNECTING PERIPHERALS TO AN INFORMATION PROCESSING DEVICE

[75] Inventor: Hidehiko Yamamoto, Yamatokoriyama, Japan

[73] Assignee: Sharp Kabushiki Kaisha, Osaka, Japan

[21] Appl. No.: 479,433

[22] Filed: Mar. 28, 1983

[30] Foreign Application Priority Data

Jan. 20, 1983 [JP] Japan ................................. 58-8121

[51] Int. Cl.[4] .............................................. G06F 11/20
[52] U.S. Cl. ................................ 307/442; 307/200 B; 307/441; 307/473; 307/475
[58] Field of Search ............... 307/200 A, 200 B, 441, 307/442, 473, 475; 365/228, 229; 364/200, 900

[56] References Cited

U.S. PATENT DOCUMENTS 4,228,496 10/1980 Katzman et al. ..................... 364/200
4,465,945 8/1984 Yin ...................................... 307/473

Primary Examiner—Stanley D. Miller
Assistant Examiner—D. R. Hudspeth
Attorney, Agent, or Firm—Birch, Stewart, Kolasch & Birch

[57] ABSTRACT

An interface circuit for an information processing device comprises a plurality of buffer circuits each formed of a plurality of C-MOS tri-state buffers. The buffers are provided for communicating between the devices and an interface line which includes a power supply line and a signal line. Each buffer is powered from its specific power source and if this specific power source is inoperative, from the remaining power sources other than its specific power source.

3 Claims, 6 Drawing Figures

4,608,504

INTERFACE CIRCUIT FOR INTERCONNECTING PERIPHERALS TO AN INFORMATION PROCESSING DEVICE

BACKGROUND OF THE INVENTION

The present invention relates to an interface circuit for an information processing device.

Each of FIGS. 1 and 2 shows a conventional interface circuit for an information processing device. FIG. 1 shows an example for driving the total system with a single power source. FIG. 2 shows another example for driving the total system with discrete power sources particular to the respective units.

Throughout the drawings, an interface line 11, units 12, power sources 13 and buffers 14 are provided.

In FIG. 2, a plurality of input/output signals are generated by a plurality of units 12 on their respective signal lines 11a of the interface line 11 while being powered with the respective power sources 13.

FIG. 3 shows an example of one of the buffers 14 as included in the system of FIG. 2.

In FIG. 3, output sides 1–3 and input sides 4–6 of said buffer 14 communicate via the interface line 11. From the output sides 1–3, the open-collector output signals OC are wired-OR and end at one of the input sides 4–6 with an termination resistor R.

Therefore, conventionally, the termination resistor R is needed to thereby provide a large loss current and prevent the desired sharp wave form. When the system capacity is to be expanded, the provision of an additional termination resistor R is needed. When a termination resistor does not have a voltage supplied thereto, the total system is inoperative.

Therefore, it is desired to provide an improved interface circuit for eliminating the above problems.

SUMMARY OF THE INVENTION

Accordingly, it is an object of the present invention to provide an improved interface circuit for an information processing device in which all the buffers included therein are continuously powered.

It is another object of the present invention to provide an improved interface circuit for an information processing device including a common power supply line in addition to an interface line.

It is a further object of the present invention to provide an improved interface circuit for an information processing device comprising a plurality of tri-state buffers, so that the buffers are continuously powered.

Briefly described, in accordance with the present invention, an interface circuit for an information processing device comprises a plurality of tri-state buffers continuously powered with a common power supply line in addition to an interface line, and lines leading to specific power sources. To the buffers, power energy can be forwarded via the common power supply line or on one of the lines from the buffers specific power sources, bidirectionally.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
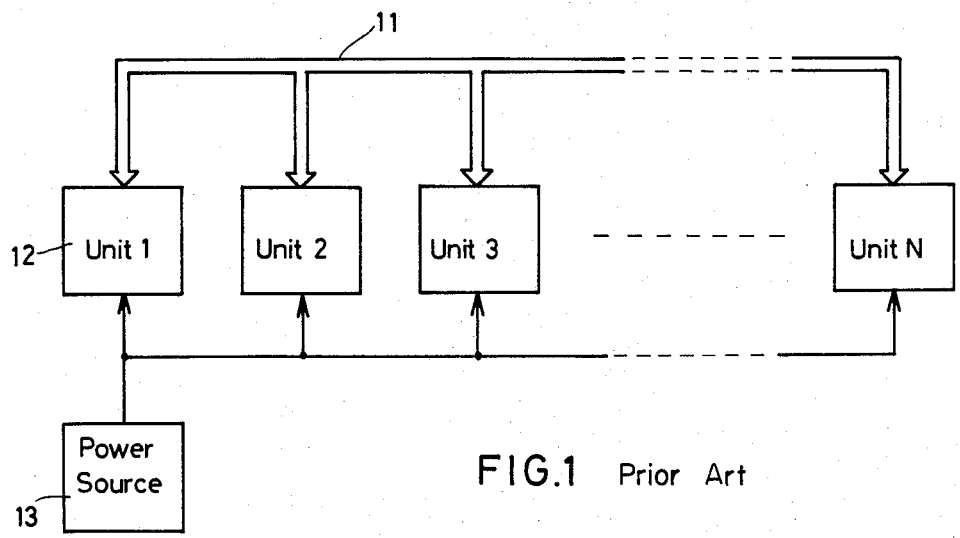
FIGS. 1 and 2 show a conventional interface circuit for a conventional information processing device.
Figure 2:
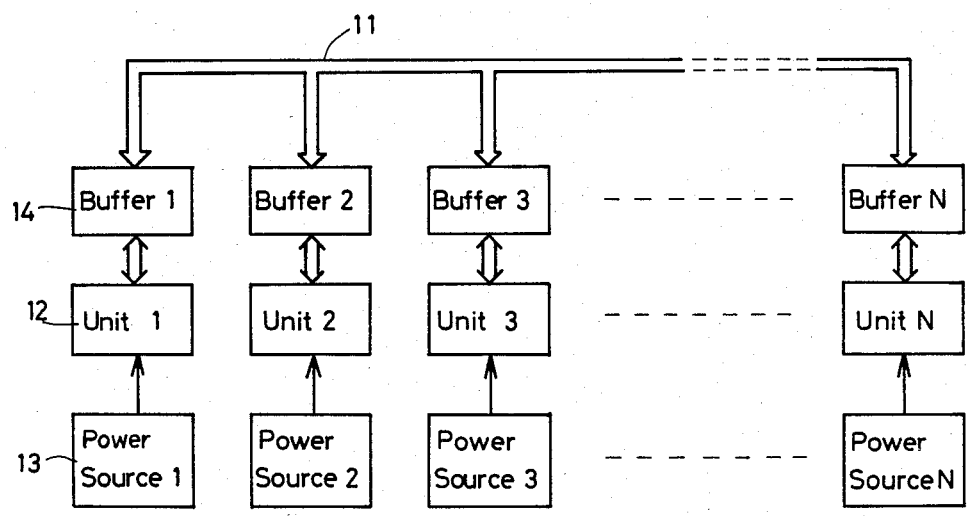
Figure 3:
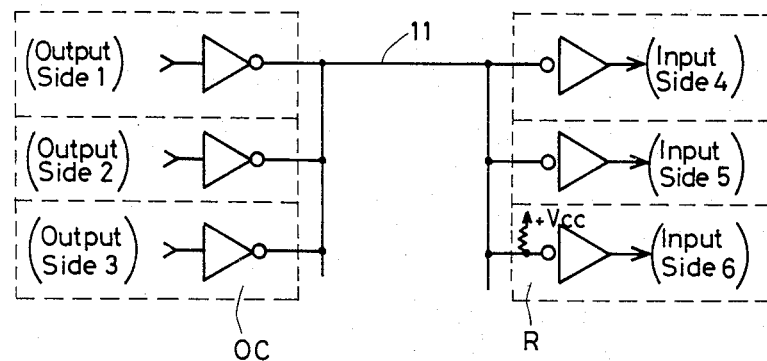
FIG. 3 shows a conventional buffer as included within the circuit of FIG. 2.
Figure 4:
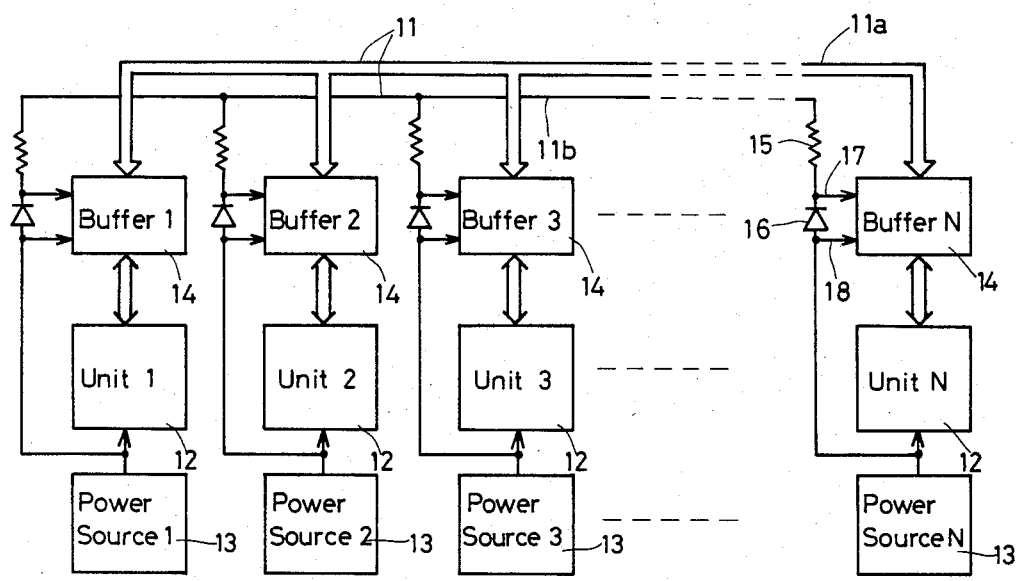
FIG. 4 shows an interface circuit for an information processing device according to the present invention.

FIG. 4 shows an interface circuit for an information processing device according to the present invention. In FIG. 4, an interface line 11 includes a signal line 11a and a common power supply line 11b.

The circuit of FIG. 4 comprises a plurality of units 12, discrete power sources 13, and buffer circuits 14 for buffering information for the units 12. A combination of a resistor 15, a diode 16, a power line 17, and an enable line 18 is connected to each of the buffers 14.

By selection, one of the units 12 is a pocket computer and each of the other unit 12 is an item of peripheral equipment such as a floppy disk, a printer, a CRT or the like.

Each of the buffers 14 comprises a plurality of C-MOS tri-state buffers which consume little current. The tri-state buffers exhibit three states including a first condition of conducting a high level signal, a second condition of conducting a low level signal, and a third condition of being nonconductive, referred to as the "open state".

The diodes 16 are connected for protecting against reverse current flows. The discrete power lines 17 carry power energy to be applied to the respective buffers 14. The enable lines 18 carry signals for enabling/disenabling the respective buffers 14 in response to the switching of the power sources 13.

According to a feature of the present invention, when no power energy is provided from a specific power source 13 via a diode 16 and the discrete power line 17, power energy is provides from the common power supply line 11b to the buffers 14 via the resistors 15 and the discrete power lines 17. This is because the common power supply line 11b is coupled to the respective buffers 14.

That is, the respective power source 13 provide power energy to the common power supply line 11b of the interface line 11 via the respective diodes 16. Therefore, even when one or more of the units 12 is not powered by its specific power source 13, the buffer 14 as related to this unit 12 is powered through the power supply line 11b via the resistor 15, so that the buffer 14 can be operated to store information for the unit 12 via the signal line 11a. Thus, the activity of the signal line 11a of the interface line 11 is independent from the condition of the discrete power sources 13. The condition of the individual power source 13 therefore do not the signal line 11a of the interface line 11 thereby.

Further, it may be possible that any of the other units 12 may detect that one of the units 12 is now powered. That is because no response is present from the unit 12 which is not powered since the buffer 14 of this unit 12 exhibits a high impedance.

In the circuit of FIG. 4, no termination resistor is required. Since the diodes 16 are connected, no loss current flows. The undesirable dullwave or smoothed shapes can therefore be avoided.

When C-MOS buffers 14 are connected, it may be feared that a latch-up problem is present between the C-MOS interfaces driven with the different power sources. However, this can be eliminated since the respective buffers 14 are powered via the common power supply line 11b positioned at the interface side.

Figure 5:
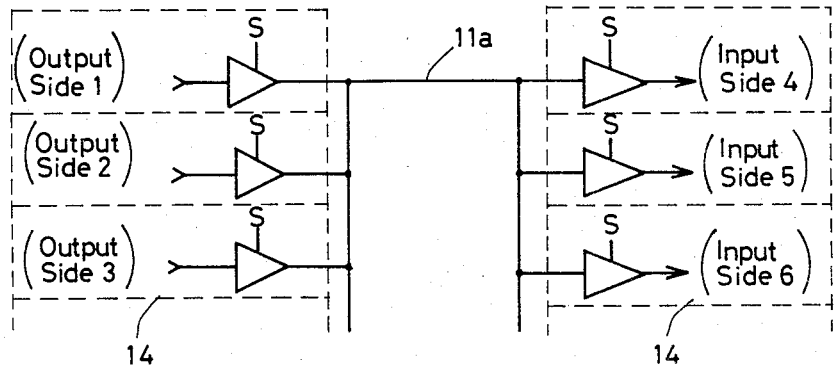
FIG. 5 shows a combination of input sides and output sides in two buffer circuits as included within the circuit of FIG. 4.

FIG. 5 shows a combination of input sides and output sides in two of the buffers 14 in the circuit of FIG. 4. In FIG. 5, the input signals and the output signals are shown in a single direction.

When the unit 12 is powered, this unit's associated power source 13 develops a voltage supplied to the buffer 14 of the remaining units 12 via the signal line 11a. In such a case, the buffer 14 whose unit 12 is not powered cannot develop the enable signal S, as this voltage cannot be applied to the enable line 18 due to back biased diode 16. Thus, this signal S is referred as a low level or a logic "O". The tri-state buffer 14 shows a high resistance between its input side and output side, so that no influence of this unit is given.

Figure 6:
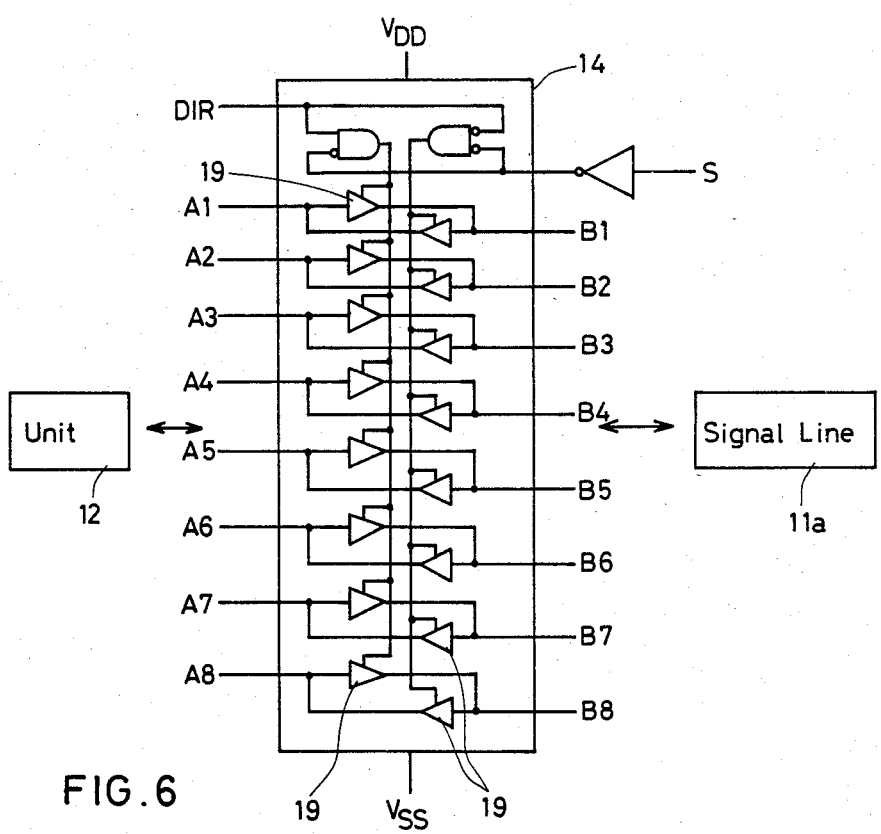
FIG. 6 shows a circuit configuration of one of buffers included within the circuit of FIG. 4.

FIG. 6 shows a more detailed construction of the buffers 14 each including a plurality of tri-state buffers 19. The number of combination of tri-state buffers 19 equals to that of input/output terminals B1–B8 of the signal line 11a which is the same as that of input/output terminals A1–A8 of the unit 12.

A voltage VDD is applied via the discrete power lines 17. A ground voltage VSS is provided.

The enable signal S is supplied to all the bi-directional circuits in the buffers 14. A selection signal DIR generated from the unit 12 is applied to the buffer 14 to select to enable either the input side buffers or the output side buffers.

The operation of the buffer 14 as shown in FIG. 6 is as follows:

(I) DIR=Logic "0" (High level) and the enable signal S=Logic "0" (Low level): All the tri-state buffers 19 are open or nonconductive, so that the unit 12 is isolated from the signal line 11a.

(II) DIR=0 and the enable signal S=1: All the buffers 19 directly connected to the input/output terminals B1–B8 are conductive, so that the signals from the signal line 11a are sent into the unit 12.

(III) DIR=1 and the enable signal S=0: All the buffers 19 are open or nonconductive, so that the unit 12 is isolated from the signal line 11a.

(IV) DIR=1 and the enable signal S=1; All the buffers 19 directly connected to the input/output terminals A1–A8 are conductive, so that the signals are sent from the unit 12 into the signal line 11a.

According to the present invention, the following advantages are obtained:

1. When the system capacity is to be expanded, no additional termination resistor is required. Any loss current due to the termination resistor is eliminated and the wave shape can be sharpened.
2. Even when one or more of the units 12 are not powered from their specific power source 13, the buffer 14 is powered from the common power supply line 11b of the interface line 11 and the power line 17, so that this buffer can be operated to buffer any information for the related unit 12.
3. The entire system including any unit which is not be powered can be operated. It is unnecessary to remove an unnecessary unit from the total system.
4. When any of the units 12 is not powered, the remaining units 12 can detect that it is not powered.

While only certain embodiments of the present invention have been described, it will be apparent to those skilled in the art that various changes and modifications may be made therein without departing from the spirit and scope of the present invention as claimed.

What is claimed is:

1. An interface circuit for an information processing system comprising:
   a data buss;
   a plurality of information processing units;
   a plurality of buffer circuits, each connecting an associated one of said information processing units to said data buss;
   a plurality of power sources, each associated with and supplying power to one of said information processing units and its associated said buffer circuit;
   a common power supply line interconnecting all of said plurality of power sources, said power supply line bidirectionally supplying power from any one of said plurality of power sources to all of said buffer circuits;
   a plurality of buffer enable means, each associated with a said buffer circuit, for monitoring the associated said power source and enabling said buffer to transfer information between said data buss and said associated information processing unit when said associated power source is supplying power thereto;
   each said buffer circuit being thereby disabled when adequate power is not supplied to its said associated information processing unit by the associated said power source while remaining powered to thereby develop a high input impedance.
2. The circuit of claim 1 wherein said buffer circuits are of a C-MOS configuration.
3. The circuit of claim 1 wherein said buffer circuits each have three states, said disabled state where said buffer circuit is nonconductive, an information input state and an information output state.

* * * * *